(12) United States Patent
Otowa et al.

(10) Patent No.: US 6,413,409 B1
(45) Date of Patent: Jul. 2, 2002

(54) FLOW-THROUGH CAPACITOR AND METHOD OF TREATING LIQUIDS WITH IT

(75) Inventors: Toshiro Otowa; Naoto Tanaka, both of Amagasaki (JP)

(73) Assignee: Biosource, Inc., Worcester, MA (US)

( * ) Notice: Subject to any disclaimer, the term of this patent is extended or adjusted under 35 U.S.C. 154(b) by 0 days.

(21) Appl. No.: 09/763,008

(22) PCT Filed: Sep. 7, 1999

(86) PCT No.: PCT/US99/20421
§ 371 (c)(1),
(2), (4) Date: Feb. 13, 2001

(87) PCT Pub. No.: WO00/14304
PCT Pub. Date: Mar. 16, 2000

(30) Foreign Application Priority Data

Sep. 8, 1998 (JP) .............................. 10-253706

(51) Int. Cl.$^7$ ............................... C02F 1/461
(52) U.S. Cl. ................. 205/748; 204/257; 204/263
(58) Field of Search .................. 204/257, 263; 205/748

(56) References Cited

U.S. PATENT DOCUMENTS

| 5,192,432 | A | * | 3/1993 | Andelman | 210/198.2 |
| 5,360,540 | A | * | 11/1994 | Andelman | 210/198.2 |
| 5,538,611 | A | * | 7/1996 | Otowa | 204/550 |
| 5,547,581 | A | * | 8/1996 | Andelman | 210/656 |
| 5,779,891 | A | * | 7/1998 | Andelman | 210/198.2 |

* cited by examiner

Primary Examiner—Arun S. Phasge
Assistant Examiner—Thomas H. Parsons
(74) Attorney, Agent, or Firm—Leslie Meyer-Leon, Esq.; IP Legal Strategies Group P.C.

(57) ABSTRACT

A separator (1), electrode (2) and collector (3), each made of a polygonal sheet, are stacked up in a multi-layer serial arrangement of $[3/2/1/2]$ sub $''/3$, with the provision of a through-hole in the respective sheets in the corresponding position for passage of a liquid. The stack is accommodated in a housing (8) so that it may be compressed from both sides at a pressure 0.5 kg per cubic meter G by tightening a retainer (4) which doubles as a cover. The liquid to be treated is passed through the capacitor through an inlet and outlet (5).

19 Claims, 11 Drawing Sheets

(a)
<application of voltage mode: purification>

(b)
<short-circuiting or constant current discharge mode: recovery>

FLOW-THROUGH CAPACITOR AND METHOD OF TREATING LIQUIDS WITH IT

BACKGROUND OF THE INVENTION

1. Field of the Invention

The present invention relates to a stacked, flow through capacitor and more particularly to a stacked, flow through, electric, double-layer capacitor. The invention further relates to a method of treating liquids containing ionic substances with a stacked, flow through capacitor.

2. Description of the Related Art

Flow through capacitors (flow through, electric, double-layer capacitors) utilize working electrodes of high surface area materials to electrostatically absorb, electrochemically react, or catalytically decompose substances that need to be removed or altered in fluids such as gases and liquids (aqueous and non-aqueous solutions). Referring to the technology by which ionic substances are electrostatically removed from water phases containing them by means of such flow through capacitors, the following published literature is available.

(1) U.S. Pat. No. 5,192,432 and U.S. Pat. No. 5,196,115 each discloses a flow through capacitor for coulostatic (constant-charge) chromatographic columns for use in the purification of liquids, comprising a plurality of adjoining layers such as a first conductive backing layer, a first high-surface-area conductive layer, a first nonconductive porous spacer, a second conductive backing layer, a second high-surface-area conductive layer, a second nonconductive porous spacer, etc., as wound together in a spiral configuration. It is also mentioned in the specifications of those patents that the above capacitor can be used in the purification of water containing ionic substances such as sodium chloride.

(2) Japanese Kokai Tokkyo Koho H5-258992 (corresponding to U.S. Pat. No. 5,415,768, U.S. Pat. No. 5620597, and U.S. Pat. No. 5,748,437) discloses not only a wound, flow through capacitor but also a stacked washer, flow through capacitor.

(3) Japanese Kokai Tokkyo Koho H6-325983 (corresponding to U.S. Pat. No. 5,538,611) discloses a flat plate, flow through, electric, double-layer capacitor comprising active carbon layers made predominantly of high specific surface area active carbon with an electrically insulating porous flow-through sheet separator interposed therebetween, a collector disposed externally of each active carbon layer, and a retaining sheet disposed further externally thereof. Generally, a frame gasket is interposed between the collector and the retaining sheet. To treat a liquid with this flow through capacitor, application of a DC constant voltage to the collectors and short-circuiting or reverse connection between the collectors is performed in an alternating manner while an ionic substance-containing liquid is passed through the capacitor.

The spirally wound, flow through capacitor (1) mentioned above involves assembling difficulties. For instance, it is difficult to prevent channeling on introduction of a liquid and to effect the tightening required in winding with good workmanship. Channeling occurs along the central support, peripheral edge, and/or front and back seals (depending on whether the direction of flow of the liquid is perpendicular or parallel to the capacitor axis). This problem must be overcome with a silicone cement or other adhesive and the literature mentions an epoxy resin as an end sealant. Thus, having a structure such that a plurality of adjacent layers is spirally wound, the wound, flow through capacitor tends to present the channeling problem and when the capacitor is applied to the purification of liquids containing ionic substances, the rate of elimination of the ionic substances fluctuates unsteadily during the purification process and, moreover, the elimination rate tends to be low on the average. Furthermore, in such a wound structure, the correct positioning of leads from the collectors is difficult. Therefore, considerable difficulties must be overcome when a wound, flow through capacitor of this type is applied to the purification of liquids on a commercial scale.

The stacked, washer electrode, flow through capacitor mentioned under (2) comprises a stack of disk-shaped electrodes and, as such, is disadvantageous costwise and practically ineffective because, of the constituent material having a given surface area, the effective area is small, the number of parts required is large, and use of a central support is essential.

Referring to the flat, plate, flow through capacitor (3), frame gaskets are generally used but because the interlayer contact is not uniform, the channeling tends to occur upon introduction of a liquid. Moreover, the volume of the liquid that can be treated with one flow through capacitor is limited so that there is room for improvement for commercial application.

Under the circumstances, the present invention has for its object to provide a flow through capacitor which features a high effective utilization rate of component parts, is easy to assemble, does not essentially require sealing around electrodes, is free from the channeling problem, and is conducive to a marked increase in the treatable load per unit time while upholding the rate of elimination of ionic substances, thus being very suited for commercial application. It is a further object of the invention to provide a method of treating liquids using said flow through capacitor.

SUMMARY OF THE INVENTION

The flow through capacitor of the present invention is a capacitor consisting essentially of a separator 1 and, as disposed on either side thereof, an electrode 2 and a collector 3 in that order.

This flow through capacitor is characterized in that each of the separator 1, electrode 2 and collector 3 is made of an independent or folded flat sheet having a polygonal configuration, that the separator 1, electrode 2, and collector 3 are stacked in the order of $$[\tfrac{3}{2}/\tfrac{1}{2}]_n/3$$

where n represents an integer of not less than 20, that the separator 1, electrode 2, and collector 3 are respectively comprised of a polygonal sheet having one or a plurality through-holes h for passage of a liquid, with the through-hole or holes h in each sheet being aligned with the corresponding through-holes in the other sheets to form an internal flow channel means upon stacking and that a stack of several layers each of said separator 1, electrode 2, and collector 3 is maintained in a condition compressed from both sides of the stack at a pressure of not less than 0.2 kg/cm$^2$ G.

The method of treating a liquid according to the invention is characterized in that while a liquid is passed through a flow through capacitor satisfying all the conditions mentioned above, the liquid is treated by a suitable combination of (A) application of a DC constant voltage or DC constant current to collectors 3 with (B) short-circuiting between the collectors 3 or constant current discharge or of (A) application of said voltage and current, (B) short-circuiting or discharge, and (C) reverse connection between the collectors 3.

DETAILED DESCRIPTION OF THE PREFERRED EMBODIMENTS OF THE INVENTION

The present invention is now described in detail.
Basic Construction

The flow through capacitor of the present invention has a basic construction such that it comprises a separator 1 and, as disposed on either side thereof, an electrode 2 and a collector 3 in that order as can be seen from the following schema:

$$3/2/1/2/3.$$

The separator 1 is an organic or inorganic sheet which a liquid may easily flow through and is electrically insulating, thus being a sheet of filter paper, a porous polymer membrane, a woven fabric, or a nonwoven fabric, for instance. The preferred thickness of the separator 1 is about 0.01~0.5 mm per layer, particularly about 0.02~0.3 mm per layer.

The electrode 2 is an active carbon layer, particularly a layer composed predominantly of an active carbon having a high specific surface area. The active carbon having a high specific surface area means an active carbon with a BET specific surface area of not less than 1000 $m^2/g$, preferably not less than 1500 $m^2/g$, and more preferably 2000~2500 $m^2/g$. If the BET specific surface area is too small, the rate of elimination of ionic substances on passage of a liquid through the capacitor is decreased. On the other hand, if the BET specific surface area is too large, the rate of elimination of ionic substances is rather decreased. Therefore, the BET specific surface area need not be increased too much.

The particle shape of active carbon can be freely selected and may for example be powdery, granular or fibrous. In the case of powdery or granular carbon, it can be used as molded in the form of a sheet. When a fibrous carbon is used, it is processed into a cloth or felt-like sheet beforehand. Use of powdery or granular active carbon as molded into a sheet is by far advantageous costwise than use of a fabric or felt-like sheet of carbon.

The molding of active carbon into a sheet form can be carried out by, for example, mixing a powdery or granular active carbon with a binder component (polytetrafluoroethylene, phenolic resin, carbon black, etc.) and/or a dispersant (e.g. a solvent), molding the mixture into a tabular form, and subjecting the resulting sheet to a suitable heat treatment. When a sheet of carbon is used for active carbon layers (2), (2), it may be perforated beforehand where necessary. Regarding the technology of utilizing a sheet of active carbon, reference can be made to the relevant disclosures in Japanese Kokai Tokkyo Koho (KTK) S63-107011, KTK H3-122008, KTK H3-228814, KTK S63-110622, KTK S63-226019, and KTK S64-1219, among other literature.

The thickness of the electrode 2 is generally about 0.1~3 mm, particularly about 0.5~2 mm, but the range is not critical.

Figure 1:
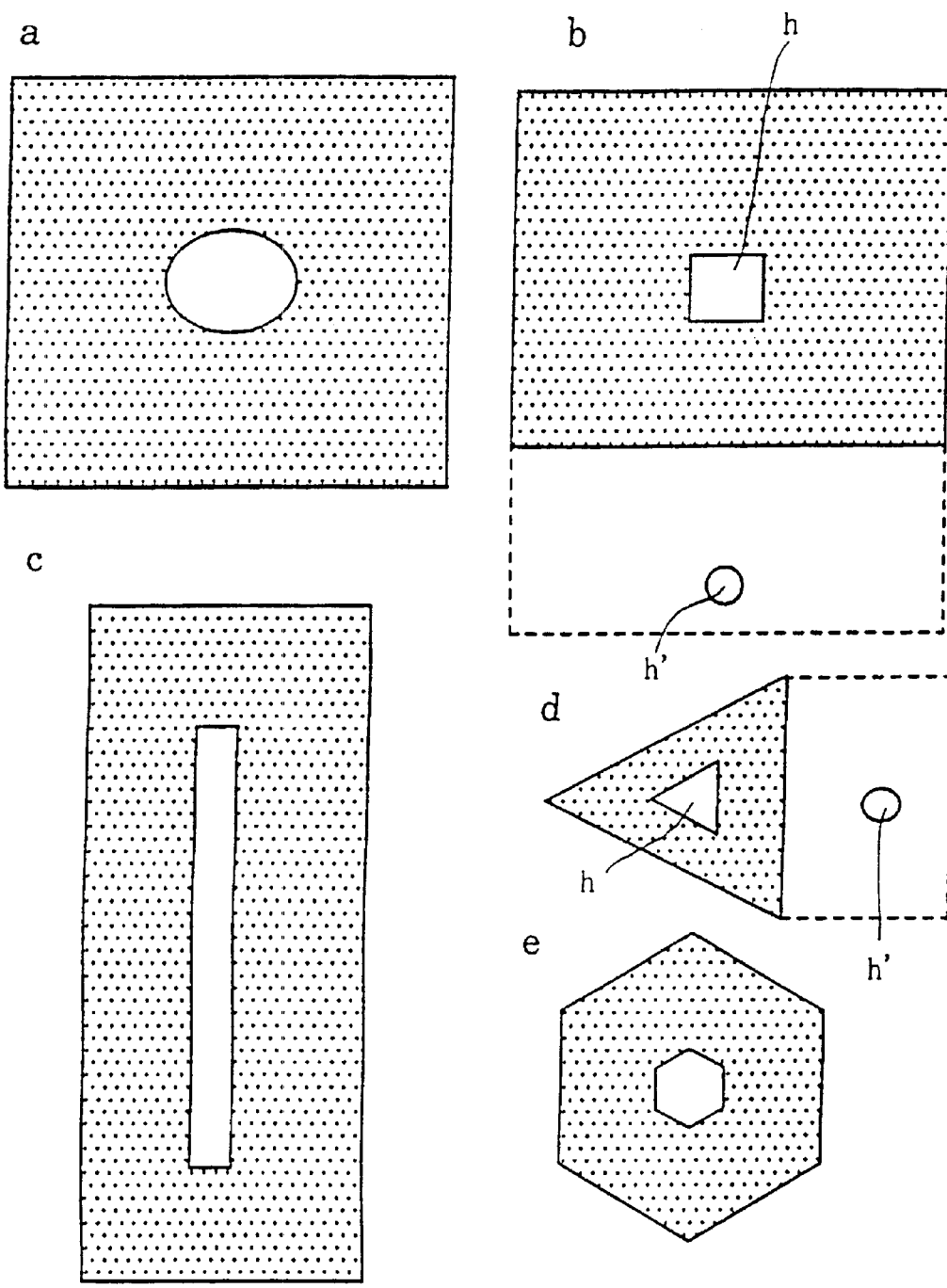
FIG. 1 is a diagram showing typical polygonal sheet configurations.

The collector 3 is an electrode made of a good electric conductor material, such as a copper sheet, aluminum sheet, carbon sheet, graphite foil, or the like, and capable of intimate contact with the electrode 2. The thickness of the collector 3 is not critical but may be about 0.1~0.5 mm in many instances. To facilitate application of an electric current, the collector 3 can be provided with an extension or terminal (lead).
Polygonal Sheet Configuration In the flow through capacitor of the invention, each of the separator 1, electrode 2, and collector 3 layers consists in an independent or folded flat sheet and it is necessary that in the case of folded flat sheets, each sheet should have a polygonal configuration, e.g. triangular, quadrangular, or hexagonal, or a combination of such configurations. The reference symbols a, b, c, d and e in FIG. 1 represent typical polygonal sheet configurations. The central orifice is a through-hole h through which a liquid flows. In the case of (b) or (d) in FIG. 1, the collector sheet 3 is extending out beyond the other sheets and is provided with a through-hole h' in the extension indicated by dotted lines.

The provision of each sheet in a polygonal configuration such as a triangular, quadrangular (square, rectangular, trapezoid, parallelogrammatic, etc.), or hexagonal configuration, or a combination of such configurations is advantageous in terms of cost and materials conservation because unit sheets can be cut out from a large sheet with little waste. Among the above-mentioned configurations, quadrangular configurations are most advantageous for practical purposes.

Of the above-mentioned sheets, the unit sheet for separator 1 is slightly larger than that for electrode 2. The sheet for collector 3 is preferably designed to project somewhat beyond the sheet for electrode 2 so that a plurality of such extensions may be bundled. In this manner, lead wires for collectors 3 can be omitted.

Stack-up Construction

In the flow through capacitor of the invention, said sheets for separator 1, electrode 2, and collector 3 are stacked up in the order of $$[\tfrac{3}{2}/\tfrac{1}{2}]_n/3$$

wherein n is not less than 20. If the value of n is less than 20, the volume of treatable load per unit time will be insufficient. The larger the value of n is, the larger is the volume that can be treated in unit time. Therefore, the value of n is preferably as large as possible, e.g. $\geq 30$ or $\geq 40$ There is substantially no limit to the value of n but n is generally up to about 500 and particularly up to about 100. Several blocks of $[\tfrac{3}{2}/\tfrac{1}{2}]_n$ may be first prepared selecting a suitable number for n and those blocks may then be stacked up in the final assembling stage to provide the objective stack of $[\tfrac{3}{2}/\tfrac{1}{2}]_n/3$.

Through-holes (h), Internal Passageway

In the flow through capacitor of the invention, polygonal sheets for separator 1, electrode 2, and collector electrode 3 are respectively provided with one to several through-holes h, and it is necessary to insure that in the final stack of the sheets, the corresponding through-holes h be lined up to constitute one or several internal passageways. The formation of such through-holes h may be performed independently for each individual sheet or collectively for a stack of several sheets for each of 1, 2, and 3. As a further alternative, formation of through-holes h may be performed for a block of sheets or the final stack-up structure $[\tfrac{3}{2}/\tfrac{1}{2}]_n/3$. The latter method is advantageous in that compared with the case in which the sheets for 1, 2, and 3 are stacked up in a predetermined order while each sheet is accurately positioned, much savings in labor can be realized and the overall stacking procedure be simplified.

The number of through-holes h per sheet is 1, 2 or 3 in many instances. However, this number may be increased for the purpose of reducing pressure losses. The sheets for collector 3 may be further provided with through-holes h' in their extensions beyond the sheets for separator 1 and electrode 2 so that the through-holes h' may assist in positioning at stacking and be utilized as a cathode or an anode after bundling.

The configuration of the through-hole h may for example be circular, elliptical, triangular, quadrangular, hexagonal, or octagonal, or in the form of a slit.

Stacking Pressure

In the flow through capacitor of the invention, the multi-layer stack of separator 1, electrode 2, and collector 3 must be secured in the condition compressed from both sides at a pressure of not less than 0.2 kg/cm$^2$ G.

If the pressure for compression is less than 0.2 kg/cm$^2$ G, the sheet-to-sheet contact may not be thorough and sufficient and channeling may occur upon passage of a liquid. This pressure is desirably as high as possible but if an excessive pressure is applied, the flow characteristics of the capacitor may deteriorate or the collectors 3 may be destroyed. Therefore, there must be a reasonable limit. The pressure is generally 0.2~10 kg/cm$^2$ G, preferably 0.3~5 kg/cm$^2$ G, and more preferably 0.5~3 kg/cm$^2$ G.

Capacitor Assembling

In assembling the above-described stack of $[\tfrac{3}{2}/\tfrac{1}{2}]_n/3$ into a flow through capacitor, a retaining plate 4 is applied against the stack and with a pressure of not less than 0.2 kg/cm$^2$ G being applied, the stack is accommodated into a suitable housing or frame. The retainer 4 is a hardly deformable flat plate made of dielectric material, such as a plastic plate. This retaining plate 4 and the housing may each be provided with a liquid inlet, a liquid outlet, and holes for set-bolts.

It is not necessary to seal the region between the ends (top and bottom ends) of the stack (the electrode 2 or collector 3) and the retaining sheet 4 or glue the periphery of the electrode 2 but such sealing and gluing, if done, will not detract from capacitor performance.

Since, in accordance with the present invention, a flow passageway is secured in a direction perpendicular to the stacking direction of sheets, assembling can be carried out without using a central support but the accuracy of positioning may be increased by installing a support through the through-holes h in the respective sheets.

Treatment of a Liquid

Using a flow through capacitor satisfying all the above requirements, the treatment of a liquid, particularly the treatment of an ionic substance-containing liquid, is carried out. The treatment of a liquid includes not only purification treatments such as the purification of water, desalination of seawater, and denitrification of waste water but also the treatment for recovery of noble metals, the purification of inorganic salts, and the treatment for capture and recovery of ionic substances, such as the assay of ionic solutes. The liquid includes those based on water or other inorganic solvents, organic solvents, or mixtures of such solvents and may for example be blood. The ionic substance includes electrolytes dissociable in solution, such as metal salts, amine salts, and ammonium salts, as well as inorganic acids, organic acids, and even chargeable substances.

With such an ionic substance-containing liquid being passed through the capacitor, the treatment is carried out in a suitable combination of [A] application of a DC constant voltage or DC constant current to collectors 3 and [B] short-circuiting between collectors 3 or a constant current discharge or in a suitable combination of [A] application of said voltage or current, [B] short-circuiting or discharge, and [C] reverse connection. For example, the combinations of ABABAB . . . , ABCBABCBABCB . . . , and ABABAB-CBCBCBABAB . . . can be used.

The treatment of an ionic substance-containing liquid is typically carried out in accordance with the following protocol.

1. Assemble the flow through capacitor and using a delivery pump or the like, feed the ionic substance-containing liquid from its liquid inlet.
2. From a DC constant voltage source, apply a voltage of about 0.5~5 volts (in the case of an aqueous solution, limit the voltage value to about 2 volts to avoid electrolysis of water) to the terminals of collectors 3. As an alternative, apply a DC constant current of 3~10 amperes, with the upper limit of the voltage set at about 2 volts.

In the case of an aqueous solution, the liquid at the liquid outlet is monitored with a conductivity meter or the like and short-circuiting or constant current discharge, application of a voltage or current, and/or reverse connection are repeated according to a suitable timing schedule. Time-wise control using a timer is possible. In short-circuiting or constant current discharge, the ionic substance electrically adsorbed on the electrodes 2 is released and discharged as a concentrated solution from the liquid outlet.

Reverse connection, that is to say switching of the polarity of connection, has the following advantage. Thus, even if a certain time elapses after completion of the discharge cycle, some potential may remain due to the internal resistance of the electrode, among other factors, so that the rate of ion elimination may drop in the immediately following cycle but when the connection polarity is reversed every few cycles, the ions adsorbed by the residual potential is readily released by the electric repulsive force in reverse connection.

In the treatment of a liquid, it is advantageous to reverse the direction of liquid flow according to a predetermined program, for the substances which may plug the equipment can then be flushed off.

While the capacitor is not used or in the preparation before use, it is preferable to maintain the capacitor in a condition such that a voltage only is applied without introduction of a liquid. In this condition, a very clean liquid is formed within the electrode to redissolve the various salts precipitated on the electrode surface so that the plugging of the device by such solids may be prevented or delayed.

The flow-through capacitor of the invention can be used either in parallel connection or in serial connection. Moreover, the discharge current of one previously charged capacitor can be used as a charging current for another capacitor and this is particularly useful for supplying a large initial current. The flow-through capacitor of the invention can be applied to a fuel cell.

Operation

The principle of treatment of an ionic substance-containing liquid with the flow-through capacitor of the invention is now explained taking the case in which said ionic substance-containing liquid is an aqueous solution of sodium chloride as an example.

Figure 2:
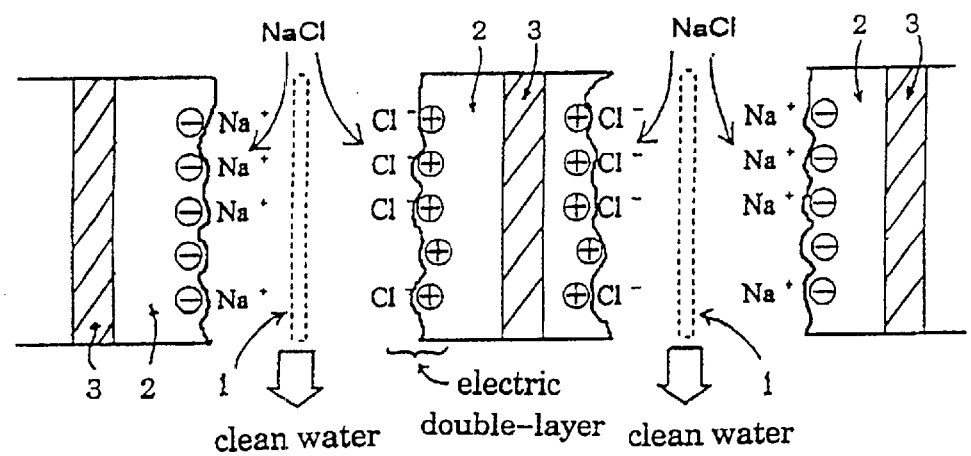
FIG. 2 is a schematic diagram showing the principle of treatment of an ionic substance-containing liquid with a flow through capacitor of the invention.
Figure 2:
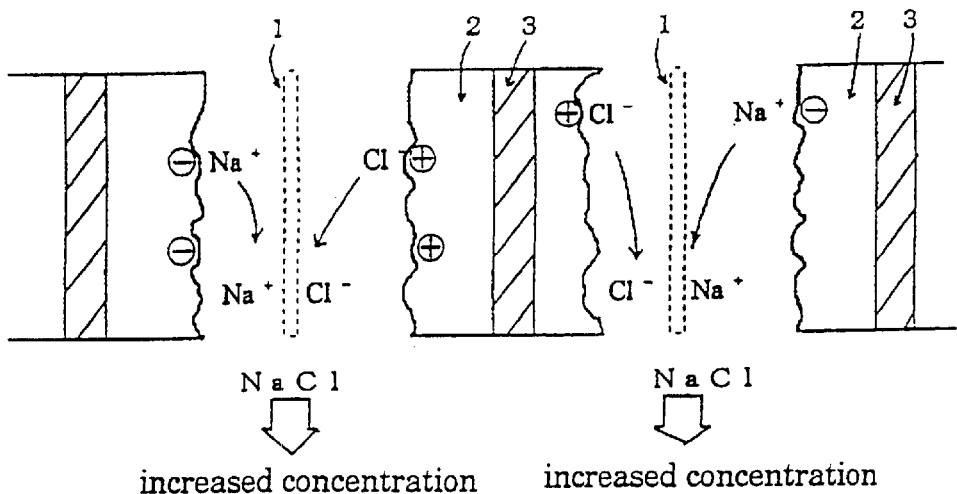

As illustrated in FIG. 2($a$), the sodium ions in the fed water are electrically adsorbed on the electrode 2 adjoining the collector 3 on the anode side upon application of a voltage, while the chloride ions are electrically adsorbed on the electrode 2 adjoining the collector 3 on the cathode side, with the result that the sodium chloride concentration of the liquid at the outlet is considerably decreased. As the passage of water is continued, the adsorption of the two kinds of ions on the electrodes 2, 2 reach a point of saturation so that the sodium chloride concentration of the outlet water becomes close to that of the feed water. When short-circuiting is performed between the cathode and anode sides or a constant current discharge is made at suitable timing, the sodium ions and chloride ions adsorbed on the corresponding electrodes 2 are released so that an aqueous solution of sodium chloride which is by far concentrated as compared with the feed liquid is discharged from the outlet as shown in FIG. 2($b$). In this process, the sodium chloride concentration of the liquid at the outlet can be further increased by, for example, decreasing the feeding flow rate.

In the present invention, each of separator 1, electrode 2 and collector 3 comprises a polygonal flat sheet and those sheets are stacked up in a multi-layer arrangement of $[\frac{3}{2}/\frac{1}{2}]_n/3$. In addition, the respective members are formed with through-holes h in the corresponding positions to form an internal passageway and the whole stack is maintained in the condition compressed from both sides at a pressure of not less than 0.2 kg/cm² G. Therefore, the present invention provides many meritorious results including the advantage that a large number of unit sheets can be cut out of a large stock sheet, that the stack can be evenly compressed, that channeling on introduction of a liquid can be effectively precluded, that the treatable load per unit area can be remarkably increased, that the rate of elimination of ionic substances can be made steady, and that the elimination rate can be maximized.

The following examples illustrate the present invention in further detail.

EXAMPLE 1

Construction of a Flow through Capacitor

Figure 3:
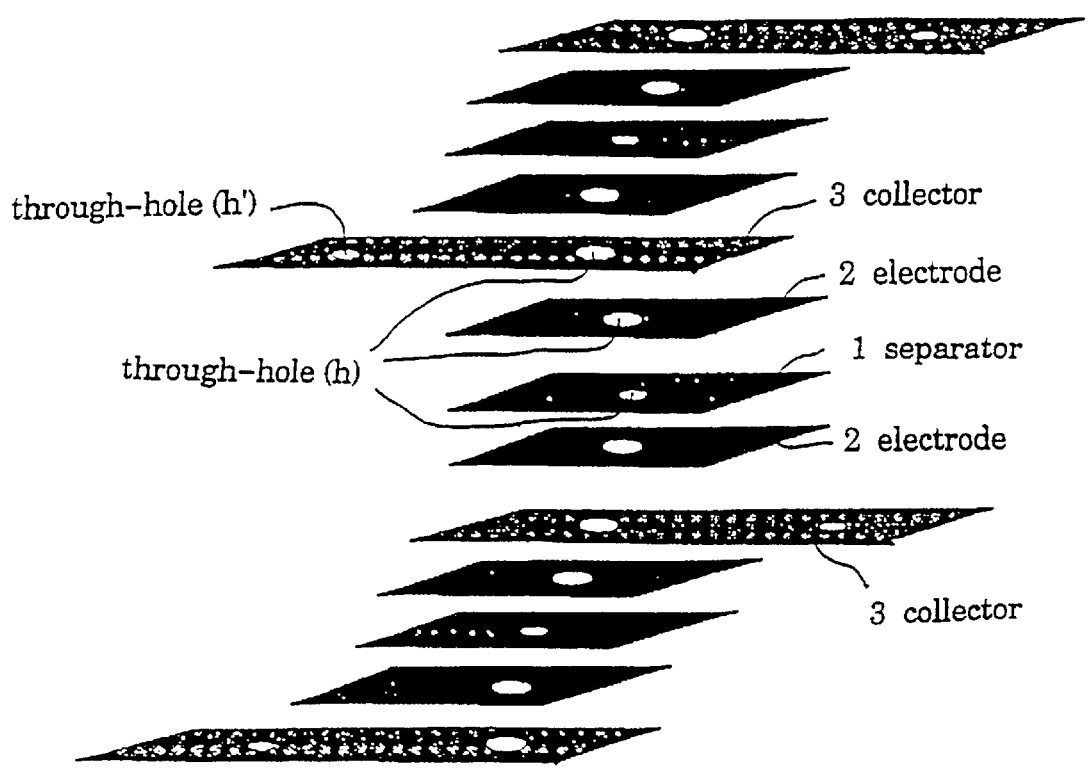
FIG. 3 is a disassembled view showing an example of the principal part of the flow-through capacitor of the invention.
Figure 4:
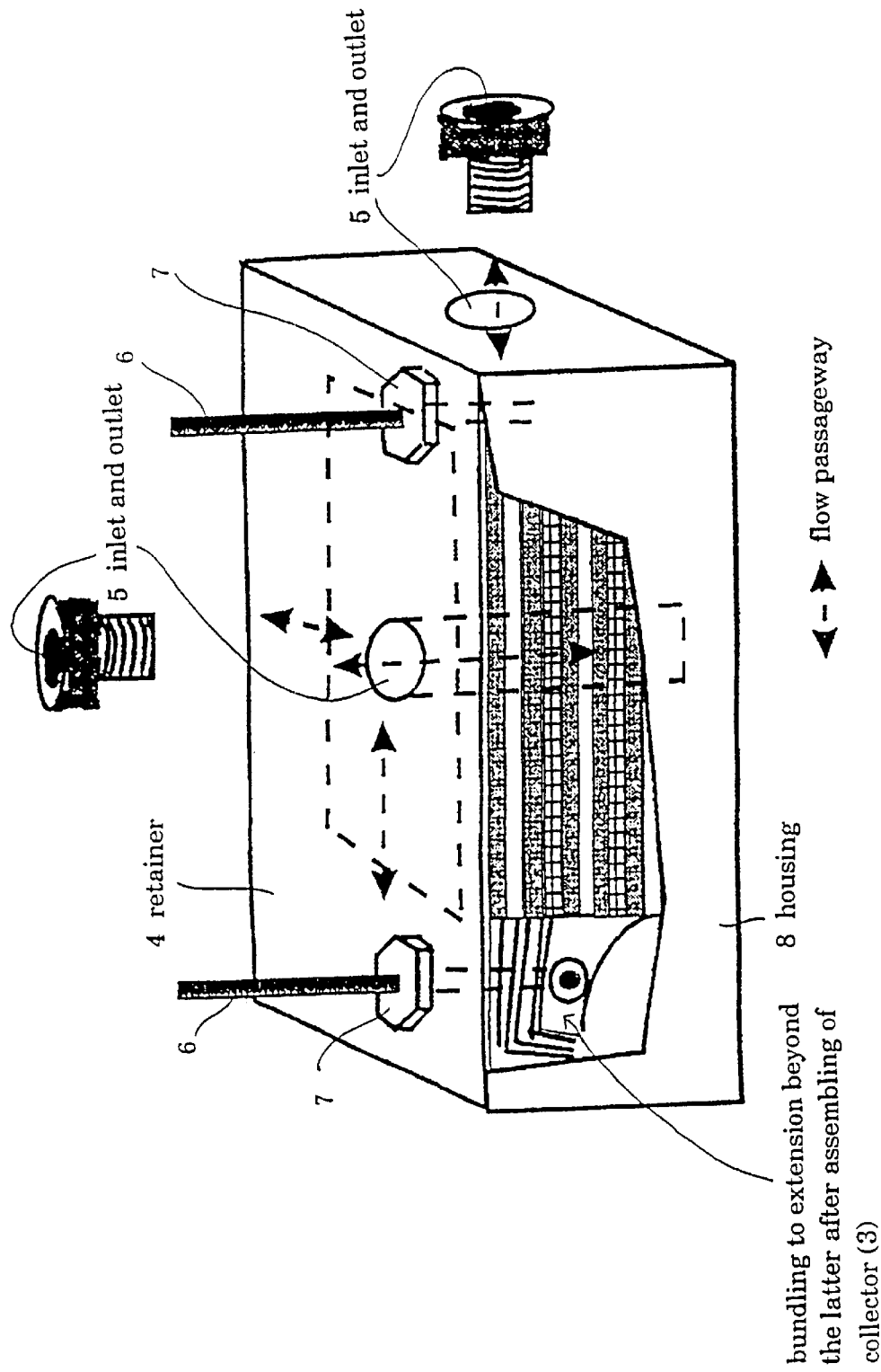
FIG. 4 is a perspective view showing an example of the flow-through capacitor.

FIG. 3 is a disassembled view showing an example of the principal part of a flow through capacitor embodying the principle of the invention. It should be understood that for convenience in draftsmanship, the case of n=3 is shown but n is equal to 40 in Example 1 which appears below. FIG. 4 is a perspective view showing an example of the flow through capacitor of the invention.

The reference numeral 1 indicates a separator which is a square sheet of paper measuring 130 mm×130 mm with a thickness of about 0.2 mm. The separator 1 is provided with a through-hole h, 25 mm in diameter, in the neighborhood of its center.

The reference numeral 2 indicates an active carbon layer, as an example of electrode, which has a square configuration of 120 mm×120 mm and a specific gravity of 0.4. This electrode is fabricated by activating petroleum coke with potassium hydroxide to prepare a granular high-specific-surface-area active carbon with a BET specific surface area of 2200 m²/g, mixing the carbon with polytetrafluoroethylene, carbon black, and a suitable dispersing medium, and compression-molding the mixture into a sheet having a thickness of 1.0 mm. The proportion of active carbon at molding is 80 weight % and the total amount of active carbon in a single active carbon layer is 5 grams. The electrode 2 is centrally provided with a through-hole h having a diameter of 25 mm.

The reference numeral 3 indicates a collector comprising a square graphite foil measuring 120 mm×170 mm with a thickness of 125 μm. This collector 3 has an area larger than the separator 1 and electrode 2 and its extension beyond the latter after assembling is used as a terminal. The collector 3 is centrally provided with a through-hole h with a diameter of 25 mm and its extension is provided with a through-hole h' for the bundling to provide an anode or a cathode.

The above separator 1, electrode 2, and collector 3 are stacked up in a multi-layer serial arrangement of $[\frac{3}{2}/\frac{1}{2}]_n/3$ and the value of n is 40 in this Example 1.

In the assembled stack, said through-holes h are in alignment to constitute an internal flow passageway.

The above stack is accommodated in a housing as illustrated in FIG. 4 so that it may be held in the condition compressed at a pressure of 0.5 kg/cm² G by tightening the retainer 4 which doubles as a cover. In FIG. 4, the reference numeral 5 indicates an inlet and outlet for a liquid to be passed and the reference numerals 6 and 7 indicate a fastening bolt and nut, respectively. The housing is indicated at 8. The arrowmark indicates the direction of passage of the liquid.

Treatment Example 1 (treatment of an ionic substance-containing liquid)

Using the flow through capacitor shown in FIG. 4, the terminals of the respective collector electrodes 3 were connected to a 2-V direct current source and an aqueous sodium chloride solution of 0.01 M/L concentration was introduced from the liquid inlet and allowed to flow out from the liquid outlet.

Figure 5:
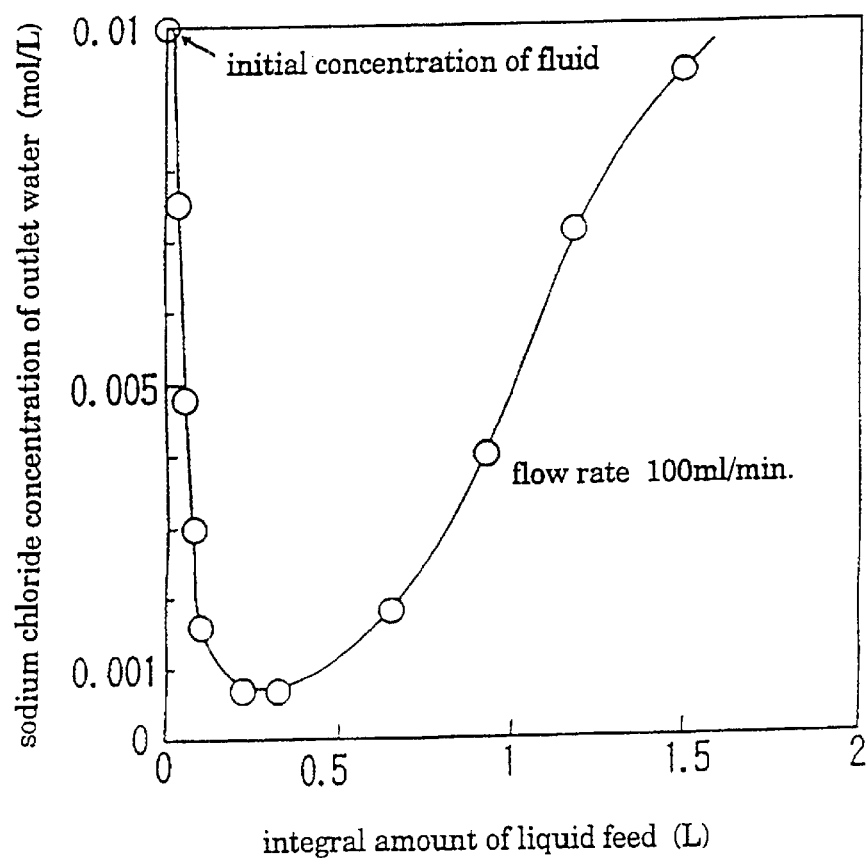
FIG. 5 is a diagram showing the relation between the integral volume of liquid feed and the outlet sodium chloride concentration in the case where an aqueous solution of sodium chloride was passed through the capacitor.

FIG. 5 shows the relation between the integral amount of liquid feed and the sodium chloride concentration of the outlet water when the feeding flow rate of the aqueous sodium chloride solution is set to 100 ml/min. It is apparent from FIG. 5 that application of a 2-V constant voltage caused a sharp decrease in the outlet sodium chloride concentration and that at the feeding flow rate of 100 ml/min., a maximum of 93% of sodium chloride is eliminated.

Figure 6:
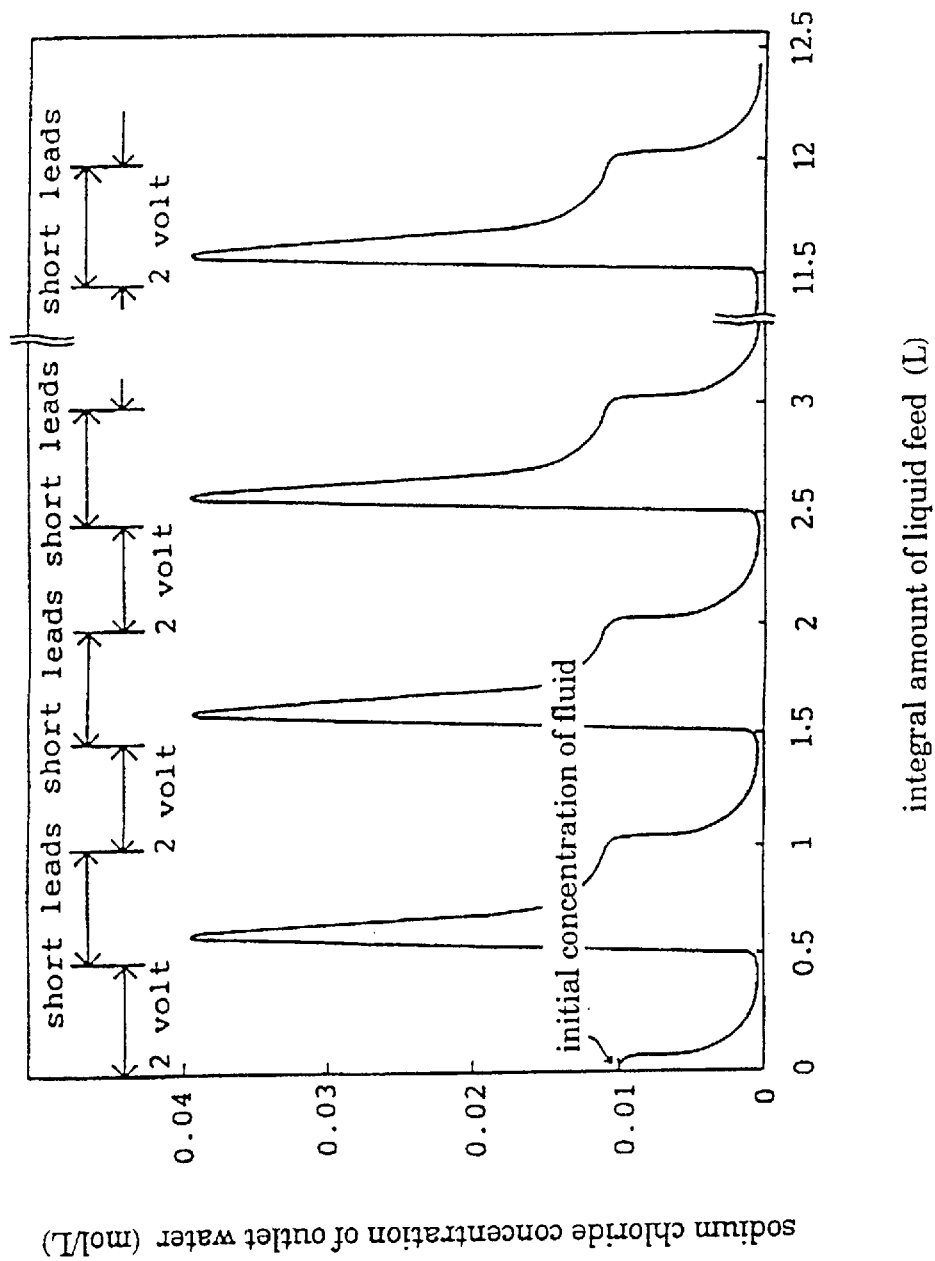
FIG. 6 is a diagram showing the relation between the integral volume of liquid feed and the outlet sodium chloride concentration in the case wherein an aqueous solution of sodium chloride was passed through the flow-through capacitor and constant-voltage application and short-circuiting were alternatingly repeated.

FIG. 6 is a graph showing the relation between the integral amount of liquid feed and the outlet sodium chloride concentration in the case where an aqueous solution of sodium chloride was passed through the flow-through capacitor of FIG. 4 and application of a constant voltage and a short-circuit were alternatingly repeated.

Thus, using the above flow through capacitor, the terminals of the collectors 3 were connected to a 2-V DC source and an aqueous sodium chloride solution of 0.01 M/L concentration was introduced from the liquid inlet at a flow rate of 100 ml/min. and allowed to flow out from the liquid outlet. The application of a 2-V constant voltage and short-circuiting were repeated according to the timing schedule shown in FIG. 6 and the concentration of sodium chloride in the solution flowing out from the liquid outlet was determined. The results are shown in FIG. 6.

It is apparent from FIG. 6 that application of a 2-V constant voltage caused a sharp decrease in outlet sodium chloride concentration and a maximum of 93% of sodium chloride was removed, that when short-circuiting was performed, a solution with a sodium chloride concentration increased about 4-fold at the maximum was discharged, that when application of the voltage was resumed when the outlet sodium chloride concentration had approached that of the feed solution, the outlet sodium chloride concentration was sharply decreased again and a maximum of 93% of sodium chloride was removed, that when short-circuiting was performed, a solution with a sodium chloride concentration increased about 4-fold at the maximum was discharged, that even when the same pattern of operations was repeated for a total of at least 10 times, similar results were obtained, and that the feed volume was large. Thus, it is clear that the liquid feed is large, that the rate of deionization is steady and high, and hence that a high liquid load can be treated.

Treatment Example 2

Figure 7:
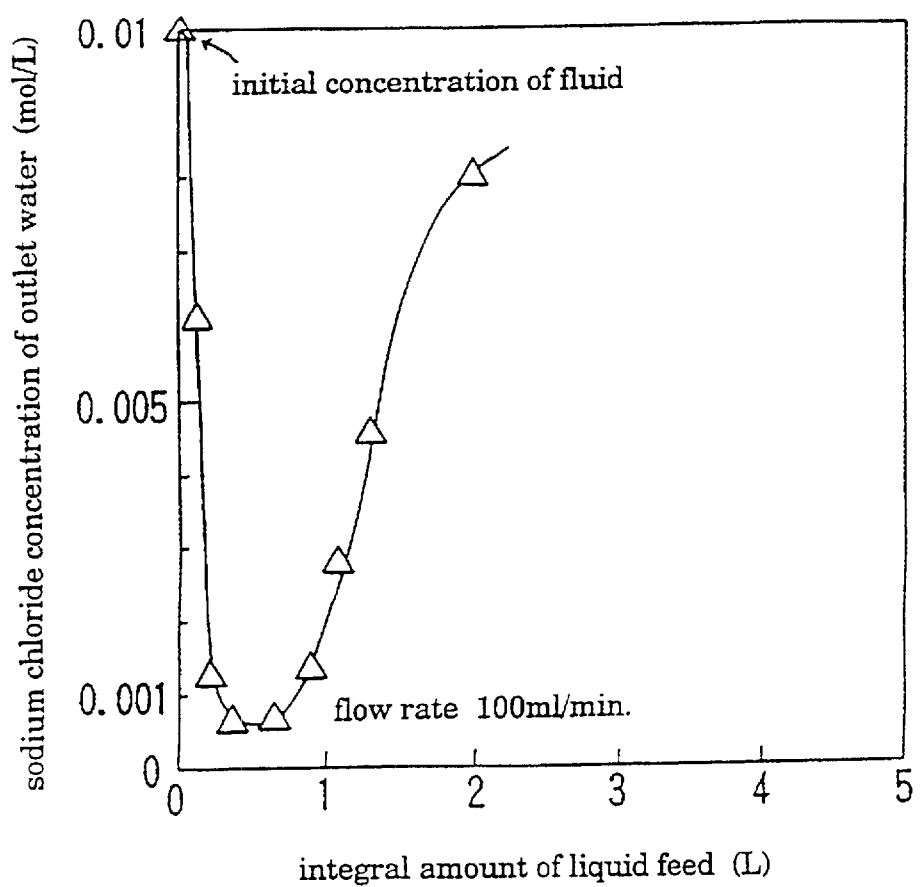
FIG. 7 is a diagram showing the results obtained in the case where constant-voltage application and short-circuiting were followed by reverse connection.

While application of a 2-V constant voltage and short-circuiting were repeated as in Treatment Example 1, application of the 2-V constant voltage and short-circuiting were followed by reverse connection in this example. The results are shown in FIG. 7.

Treatment Example 3

In the above Treatment Example 2, the capacitor was kept loaded with a voltage without passage of a liquid throughout while it remained unused and in the preparation stage prior to use. When this procedure was followed, a very clean liquid was formed within the electrodes and the various salts precipitated on the electrode surface were redissolved, with the result that occlusion of the device by solid precipitates could be prevented or retarded.

Treatment Example 4

Figure 8:
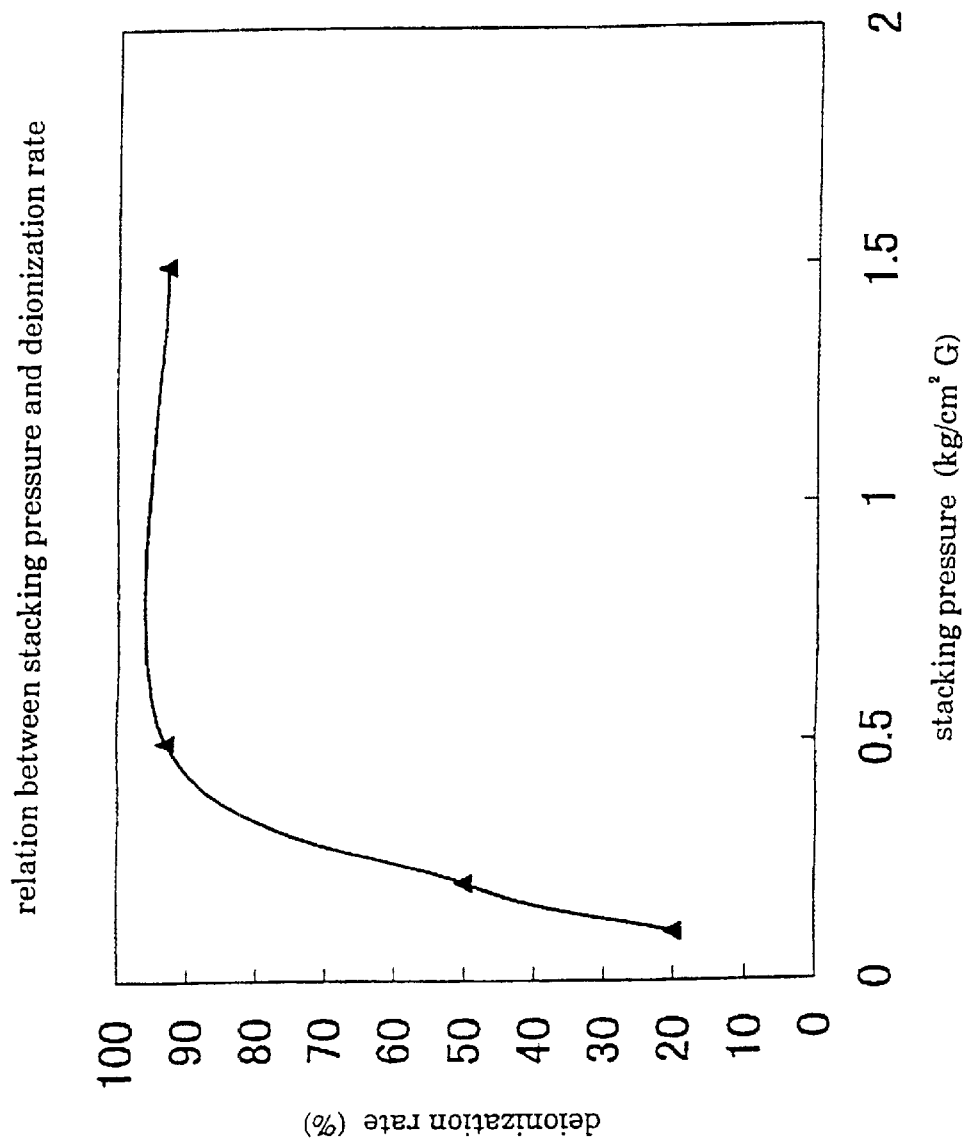
FIG. 8 is a diagram showing the relation between stacking pressure and deionization rate as analyzed using the flow through capacitor of the invention.

Using the same flow through capacitor as used in Example 1, the relation between stacking pressure and the rate of deionization was determined under the following conditions to generate the data: 0.1 kg/cm² G, 20%; 0.2 kg/cm² G, 50%; 0.5 kg/cm² G, 93%; and 1.5 kg/cm² G, 93%. The data are shown in FIG. 8. From those results, the maximum rate of elimination of ions was 93%.

Electrode (2) : a fibrous active carbon sheet measuring 100 mm×100 mm, 30 sheets stacked (60 g)

Liquid passage conditions: 0.01 mol/L NaCl, 180 ml/min.

Treatment Example 5

Table 1 shows the bacterial count in the outlet liquid as determined by using the flow through capacitor of Example 1 and passing a culture of *Bacillus subtilis*. It is apparent that the device of the invention has a bactericidal action. The conditions were as follows.

Electrode (2): a fibrous active carbon sheet measuring 100 mm×100 mm, 30 sheets stacked (60 g)

Stacking pressure: 0.5 kg/cm² G

Liquid passage conditions: 0.01 mol/LNaCl, 60 ml/min.

TABLE 1

| Voltage applied | Bacterial count (cells/ml) | |
|---|---|---|
| (V) | Inlet | Outlet |
| 0 | $1 \times 10^6$ | $1 \times 10^6$ |
| 1.0 | $1 \times 10^6$ | $7 \times 10^5$ |
| 1.5 | $1 \times 10^6$ | $4 \times 10^5$ |
| 2.0 | $1 \times 10^6$ | $8 \times 10^4$ |

EXAMPLE 2

Figure 9:
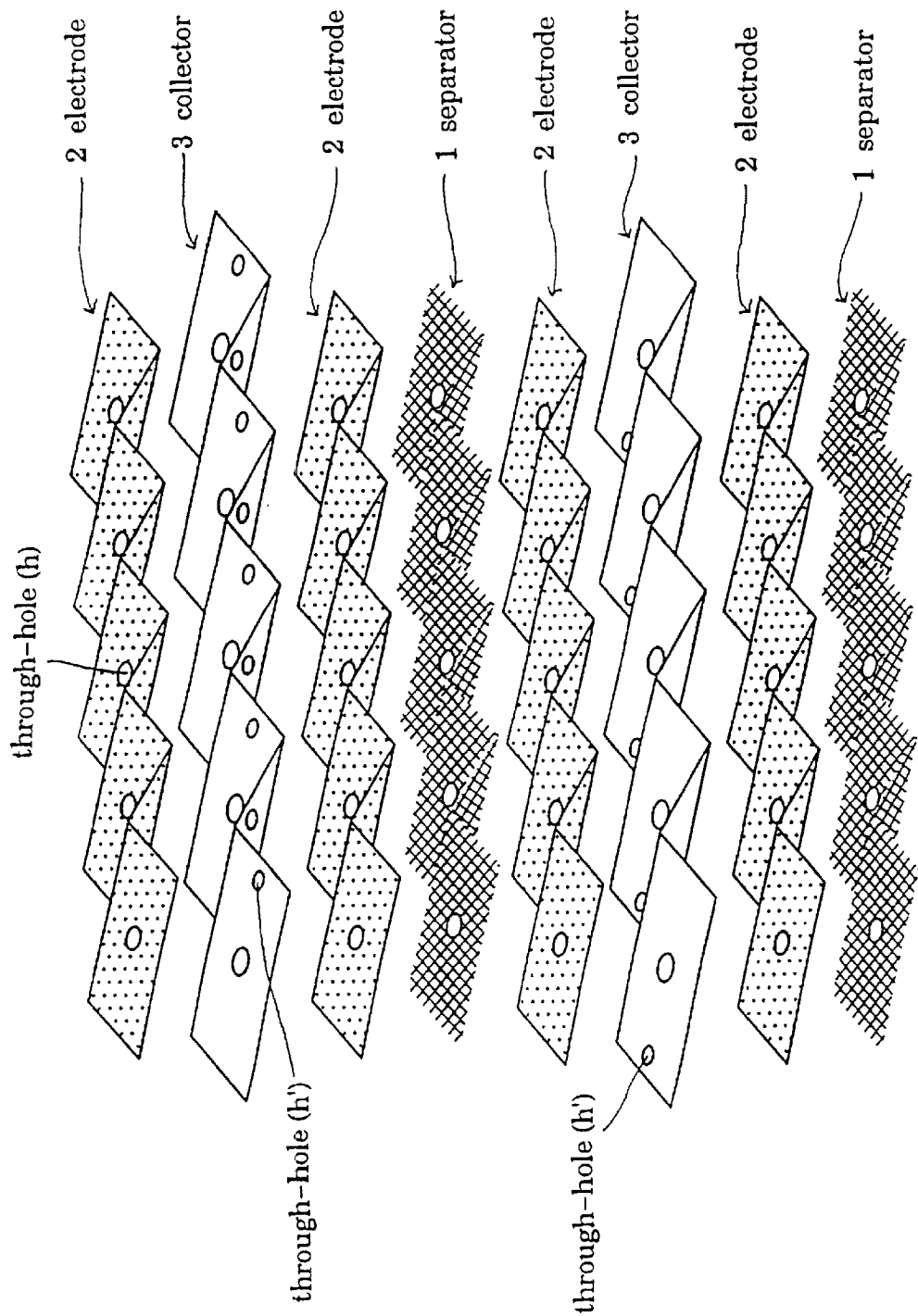
FIG. 9 is a view showing the fabrication of the separator, electrode, and collector from folded sheets.

FIG. 9 is a view showing the fabrication of separator 1, electrode 2, and collector 3 from folded sheets.

EXAMPLES 3 AND 4

Figure 10:
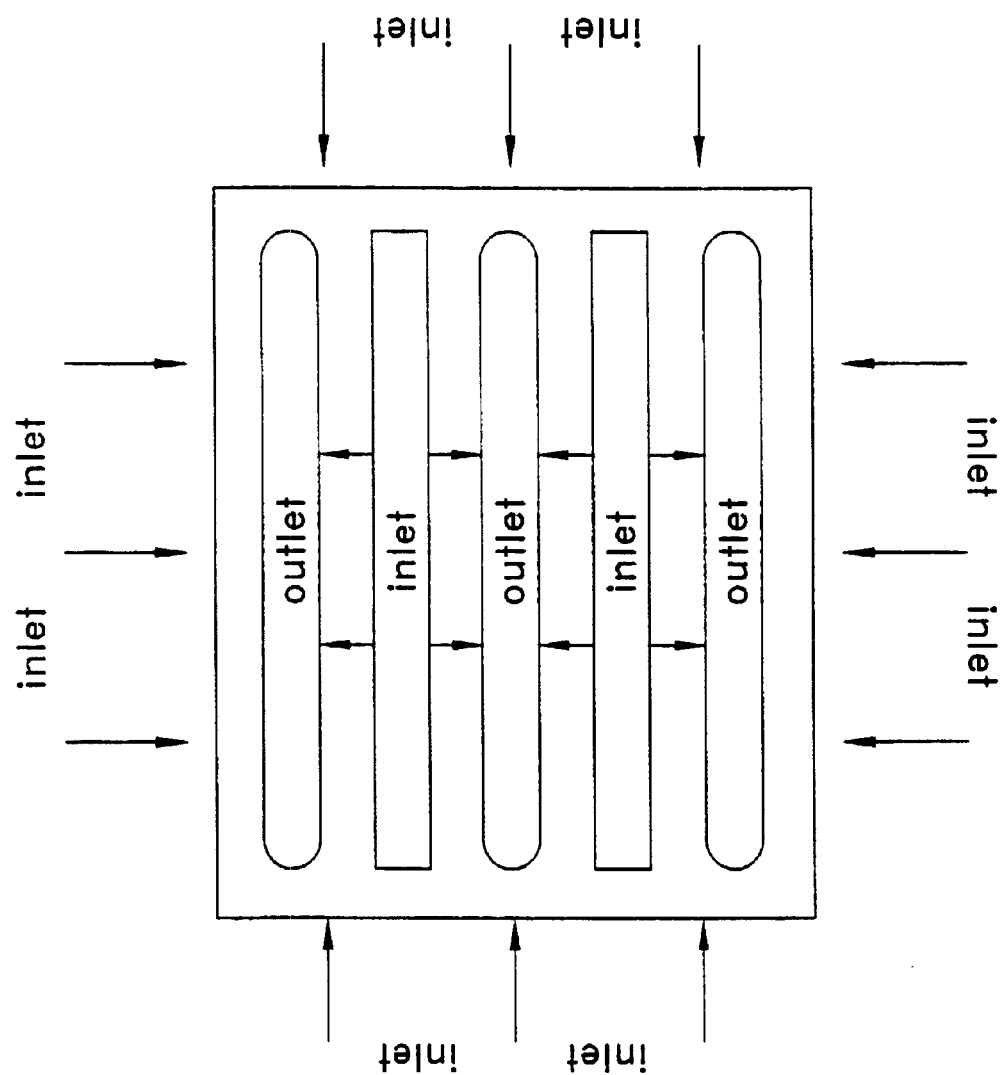
FIG. 10 is a view showing an exemplary channel design applicable to the case where the electrode is provided with a plurality of through-holes.
Figure 11:
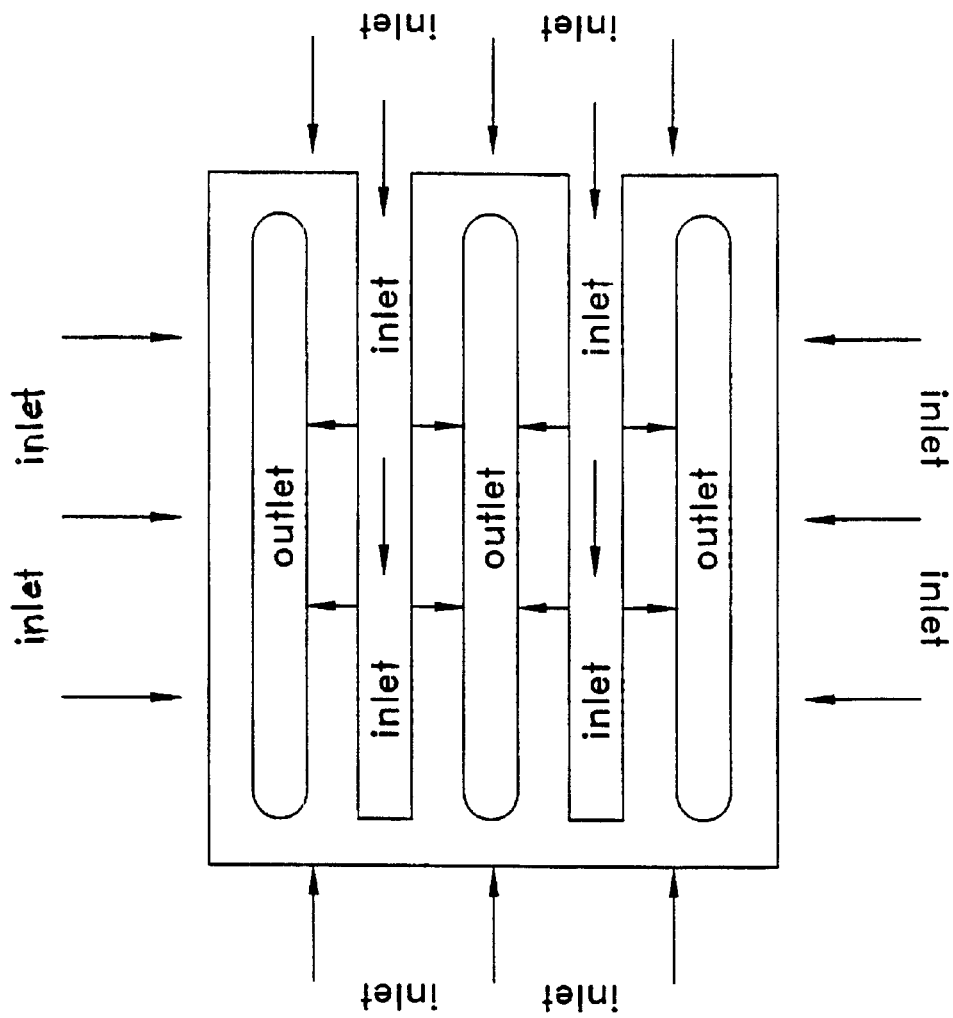
FIG. 11 is a view showing another exemplary channel design applicable to the case where the electrode 2 is provided with a plurality of through-holes.

FIGS. 10 and 11 show examples of internal flow channel design in the case where the electrode 2 is provided with a plurality of through-holes h. The liquid flows in the direction indicated by the arrowmark. The separator 1 and collector 3 are also provided with through holes h in the corresponding positions. When such a plurality of through-holes h are provided, flow passageways ensuring a smooth flow of liquid are obtained and, as an additional advantage, the size of electrode 2 can be increased.

EFFECTS OF THE INVENTION

As mentioned under the heading of Operation, the separator 1, electrode 2, and collector electrode 3 are invariably made of polygonal flat sheets and those members are stacked up in a multi-layer serial arrangement of $[3/2/1/2]_n/3$. Moreover, those members are provided with through holes h in the corresponding position to form an internal passageway and the whole stack is kept compressed from both sides at a pressure of not less than 0.2 kg/cm² G. The consequent advantage is that unit sheets can be cut out from a large stock sheet with no or little waste, that the stack can be uniformly compressed, that channeling on introduction of a liquid can be effectively precluded, that the treatable load per unit area can be remarkably increased, that the rate of ion elimination is made steady and that the elimination rate can be maximized.

The flow through capacitor of the present invention is further advantageous in that it can be easily scaled-up, for since the seal structure of this capacitor has been simplified as compared with the prior art, the number of sheets forming a stack can be easily increased and also that since the stack is compressed, a flow passageway without the channeling problem can be insured even if the size of electrode 2 is increased.

What is claimed is:

1. A flow through capacitor essentially comprising a separator, an electrode disposed on either side thereof, and a collector disposed externally of said electrode, characterized in that each of the separator, electrode and collector is an independent or folded flat sheet having a polygonal configuration, that said separator, electrode, and collector are disposed in a multi-layer serial arrangement of $[3/2/1/2]_n/3$ where n is not less than 20, that each of said separator, electrode, and collector comprises a polygonal sheet provided with one or a plurality of through-holes for passage of a liquid in such a manner that when those sheets are assembled into a stack, the corresponding through-holes are aligned to form one or more internal flow passageways, and that the stack of sheets for said separator, electrode, and collector is retained in the condition compressed from both sides at a pressure of not less than 0.2 kg/cm² G.

2. The flow through capacitor of claim 1 wherein each separator sheet is somewhat larger than the electrode sheet and each collector sheet is larger than said electrode sheet with its extension over the electrode being available for bundling.

3. The flow-through capacitor of claim 1 wherein the separator is an electrically-insulating sheet having a thickness of about 0.01 to 0.5 mm per layer.

4. The flow-through capacitor of claim 1 wherein the electrode comprises an active carbon layer with a surface area of not less than 1000 m²/g.

5. The flow-through capacitor of claim 1 wherein the electrode comprises a molded perforated sheet of carbon with a binder.

6. The flow-though capacitor of claim 1 which includes a central through-hole orifice from which liquid flows.

7. The flow-through capacitor of claim 1 wherein the collector extends out beyond the other sheets and is provided with a through-hole h in the extension.

8. The flow-through capacitor of claim 1 wherein n is up to about 500.

9. The flow-through capacitor of claim 1 wherein the stack pressure is generally 0.2~10 kg/cm² G.

10. The flow-through capacitor of claim 1 which includes a housing for the capacitor, a retaining plate, and a means to compress the retaining plate.

11. The flow-through capacitor of claim 1 which includes a means to apply constant DC voltage or current to the collectors and a means to short-circuit between the collectors.

12. The flow-through capacitor of claim 1 which includes a means to switch the polarity of connections.

13. The flow-through capacitor of claim 1 which includes a means to reverse the direction of liquid flow.

14. The flow-though capacitor of claim 1 which includes a means to maintain the voltage of the capacitor without the introduction of a liquid.

15. A method of treating a liquid using a flow-through capacitor essentially comprising a separator, an electrode disposed on either side thereof, and a collector disposed externally of said electrode and satisfying all of the following requirements:

a) providing that each of the separator, electrode, and collector is an independant or folded flat sheet having a polygonal configuration;

b) providing that said separator, electrode, and collector are disposed in a multi-layer serial arrangement of $[3/2/1/2]_n/3$, where n is not less than 20;

c) providing that each of said separator, electrode, and collector comprises a polygonal sheet provided with one or a plurality of through-holes for passage of a liquid in such a manner that when those sheets are assembled into a stack, the corresponding through-holes are aligned to form one or more internal flow passageways; and d) passing an ionic substance-containing liquid through said flow-through capacitor and subjecting the liquid to a combination of application of a DC constant voltage or a DC constant current to collectors and either short-circuiting between collectors or constant current discharge or a suitable combination of said application of said voltage or current, said short-circuiting or constant discharge, and reverse connection.

16. The method of treating a liquid according to claim 15 wherein the direction of passage of the liquid is reversed according to a predetermined program.

17. The method of treating a liquid according to claim 15 wherein, when not used or in its preparation stage, the flow-through capacitor is not loaded with the liquid, but kept loaded with a voltage.

18. The method of claim 15 which includes compressing the stacked sheets employing a moveable retaining plate with the capacitor located within a housing.

19. The method of claim 15 providing stacking pressure that the stack of sheets for said separator, electrode, and collector electrode is retained in the condition compressed from both sides at a pressure of not less than 0.2 kg/cm² G.

* * * * *